(12) United States Patent
Penacho et al.

(10) Patent No.: US 8,771,055 B2
(45) Date of Patent: Jul. 8, 2014

(54) METHOD OF GAMING, A GAMING SYSTEM, AND A GAME CONTROLLER

(75) Inventors: Gary Joseph Penacho, Henderson, NV (US); Casey Lyle Condron, Las Vegas, NV (US); Scott Monroe Stewart, Las Vegas, NV (US); Douglas Huang, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 147 days.

(21) Appl. No.: 13/207,246

(22) Filed: Aug. 10, 2011

(65) Prior Publication Data

US 2012/0040736 A1 Feb. 16, 2012

Related U.S. Application Data

(60) Provisional application No. 61/372,295, filed on Aug. 10, 2010.

(51) Int. Cl.
G07F 17/32 (2006.01)

(52) U.S. Cl.
CPC .............. *G06F 17/34* (2013.01); *G07F 17/326* (2013.01)
USPC .......................................................... 463/20

(58) Field of Classification Search
USPC .......................................................... 463/20
See application file for complete search history.

(56) References Cited

U.S. PATENT DOCUMENTS

| | | |
|---|---|---|
| 4,373,726 A | 2/1983 | Churchill |
| 4,848,771 A | 7/1989 | Richardson |
| 5,326,104 A | 7/1994 | Pease |
| 5,342,049 A | 8/1994 | Wichinsky |
| 5,457,306 A | 10/1995 | Lucero |
| 5,559,312 A | 9/1996 | Lucero |
| 5,803,808 A | 9/1998 | Strisower |
| 5,941,769 A | 8/1999 | Order |
| 5,952,640 A | 9/1999 | Lucero |
| 5,975,528 A | 11/1999 | Halaby |
| 6,019,283 A | 2/2000 | Lucero |
| 6,247,643 B1 | 6/2001 | Lucero |
| 6,251,013 B1 | 6/2001 | Bennett |
| 6,605,001 B1 | 8/2003 | Tarantino |
| 6,656,047 B1 | 12/2003 | Tarantino |
| 7,090,580 B2 | 8/2006 | Rodgers |
| 7,331,856 B1 | 2/2008 | Nakamura |
| 7,331,862 B2 | 2/2008 | Rodgers |

(Continued)

FOREIGN PATENT DOCUMENTS

| | | |
|---|---|---|
| EP | 0303137 | 11/1992 |
| WO | 9634345 | 10/1996 |

(Continued)

*Primary Examiner* — Pierre E Elisca
(74) *Attorney, Agent, or Firm* — Hanley, Flight & Zimmerman, LLC

(57) ABSTRACT

Certain examples disclose a gaming system comprising a display, a symbol selector, a symbol evaluator and a symbol modifier. The example symbol selector is arranged to select a plurality of sets of symbols for display on the display. The example symbol evaluator is arranged to determine whether the displayed symbols include any winning symbol combination. The example symbol modifier is arranged to, upon a determination that the displayed symbols include any winning symbol combination, repeatedly apply a modification rule to at least one of the plurality of sets of symbols until the displayed symbols do not include any winning symbol combination.

50 Claims, 10 Drawing Sheets

(56) References Cited

U.S. PATENT DOCUMENTS

| | | |
|---|---|---|
| 7,331,866 B2 | 2/2008 | Rodgers |
| 7,371,170 B2 | 5/2008 | Cregan |
| 7,371,173 B2 | 5/2008 | Gatto |
| 7,578,735 B2 | 8/2009 | Frizzell |
| 7,578,737 B2 | 8/2009 | Cregan |
| 7,578,738 B2 | 8/2009 | Cregan |
| 7,601,062 B2 | 10/2009 | Cole |
| 7,637,808 B2 | 12/2009 | Roukis |
| 2002/0010017 A1 | 1/2002 | Bennett |
| 2002/0055381 A1 | 5/2002 | Tarantino |
| 2002/0140565 A1 | 10/2002 | Liu |
| 2003/0008698 A1 | 1/2003 | Stone |
| 2003/0078094 A1 | 4/2003 | Gatto |
| 2004/0048650 A1 | 3/2004 | Mierau |
| 2004/0072612 A1 | 4/2004 | Rodgers |
| 2004/0097280 A1 | 5/2004 | Gauselmann |
| 2004/0162131 A1 | 8/2004 | Shuster |
| 2005/0026677 A1 | 2/2005 | Roukis |
| 2005/0043082 A1 | 2/2005 | Peterson |
| 2005/0054420 A1 | 3/2005 | Cregan |
| 2005/0054436 A1 | 3/2005 | Frizzell |
| 2005/0096113 A1 | 5/2005 | Gabuchian |
| 2005/0148384 A1 | 7/2005 | Marks |
| 2006/0068892 A1 | 3/2006 | Gomez |
| 2006/0084492 A1 | 4/2006 | Baerlocher |
| 2006/0084498 A1 | 4/2006 | Baerlocher |
| 2006/0084499 A1 | 4/2006 | Moshal |
| 2006/0166740 A1 | 7/2006 | Sufuentes |
| 2006/0189373 A1 | 8/2006 | Shuster |
| 2006/0189377 A1 | 8/2006 | Gomez |
| 2007/0004489 A1 | 1/2007 | Rodgers |
| 2007/0021175 A1 | 1/2007 | Rodgers |
| 2007/0021188 A1 | 1/2007 | Rodgers |
| 2007/0037624 A1 | 2/2007 | Mitchell |
| 2007/0161424 A1 | 7/2007 | Gatto |
| 2007/0167218 A1 | 7/2007 | Rothschild |
| 2007/0232384 A1 | 10/2007 | Pace |
| 2008/0076521 A1 | 3/2008 | Little |
| 2008/0102928 A1 | 5/2008 | Daley |
| 2008/0108409 A1 | 5/2008 | Cole |
| 2008/0139298 A1 | 6/2008 | Rodgers |
| 2008/0153565 A1* | 6/2008 | Wakker et al. ............... 463/16 |
| 2008/0153578 A1 | 6/2008 | Gatto |
| 2008/0153586 A1 | 6/2008 | Gatto |
| 2008/0207305 A1 | 8/2008 | Cregan |
| 2008/0214283 A1 | 9/2008 | Cregan |
| 2008/0254893 A1 | 10/2008 | Patel |
| 2009/0048026 A1 | 2/2009 | French |
| 2009/0117979 A1 | 5/2009 | Decasa |
| 2009/0117989 A1* | 5/2009 | Arezina et al. ............... 463/20 |
| 2009/0191933 A1 | 7/2009 | French |
| 2009/0233686 A1* | 9/2009 | Nguyen ...................... 463/20 |
| 2010/0041470 A1 | 2/2010 | Preisach |
| 2010/0048289 A1 | 2/2010 | Mitchell |
| 2010/0056265 A1 | 3/2010 | Roukis |
| 2011/0117987 A1* | 5/2011 | Aoki et al. .................. 463/20 |
| 2012/0040735 A1 | 2/2012 | Katyal ........................ 463/20 |
| 2012/0058814 A1* | 3/2012 | Lutnick et al. .............. 463/25 |
| 2012/0329551 A1* | 12/2012 | Arezina et al. ............... 463/25 |
| 2013/0012298 A1* | 1/2013 | Bennett ....................... 463/20 |

FOREIGN PATENT DOCUMENTS

| | | |
|---|---|---|
| WO | 9706865 | 2/1997 |
| WO | 0020082 | 4/2000 |
| WO | 0064545 | 11/2000 |
| WO | 0120489 | 3/2001 |
| WO | 0136059 | 5/2001 |
| WO | 0139855 | 6/2001 |
| WO | 0180961 | 11/2001 |
| WO | 02056984 | 7/2002 |
| WO | 2004078297 | 9/2004 |
| WO | 2005020159 | 3/2005 |
| WO | 2005033825 | 4/2005 |
| WO | 2006036516 | 4/2006 |
| WO | 2007081377 A2 | 7/2007 |
| WO | 2007081377 A3 | 7/2007 |
| WO | 2008005351 | 1/2008 |
| WO | 2009026110 | 2/2009 |

* cited by examiner

METHOD OF GAMING, A GAMING SYSTEM, AND A GAME CONTROLLER

CROSS-REFERENCE TO RELATED APPLICATIONS

The present application claims the benefit of priority to U.S. Provisional Patent Application No. 61/372,295, filed on Aug. 10, 2010, entitled "A METHOD OF GAMING, A GAMING SYSTEM, AND A GAME CONTROLLER", which is herein incorporated by reference in its entirety.

FIELD

The present invention relates to an electronic method of gaming, a gaming system, and a game controller.

BACKGROUND

It is known to provide spinning-reel type games in stand alone gaming machines. To initiate a game, a player places a wager to cause the reels to spin. After the reels stop spinning, the player wins an award if there is a winning symbol combination. Conventionally, after an award is made to the player, the player either cashes out or initiates a new game by placing a new wager.

While such gaming systems provide players with enjoyment, a need exists for alternative gaming systems in order to maintain or increase player enjoyment.

BRIEF SUMMARY

In a first aspect, the invention provides an electronic method of gaming, including:
  (a) selecting a plurality of sets of symbols for display on a display;
  (b) determining whether the displayed symbols include any winning symbol combination; and
  (c) upon determining that the displayed symbols include any winning symbol combination, repeatedly applying a modification rule to at least one of the plurality of sets of symbols until the displayed symbols do not include any winning symbol combination.

In an embodiment, the electronic method includes making an award for each winning symbol combination.

In an embodiment, the modification rule is applied to the sets of symbols that contribute to the winning symbol combination.

In an embodiment, the modification rule is applied to a random set of symbols.

In an embodiment, the modification rule is applied to a set of symbols selected by a player.

In an embodiment, each set of symbols is displayed on the display at respective ones of a plurality of columns of display positions.

In an embodiment, each set of symbols to be displayed is selected from a respective one of a plurality of predetermined source symbol sets.

In an embodiment, the modification rule is that a different set of symbols is selected from the plurality of predetermined source symbol sets for each of the sets of symbols to be modified.

In an embodiment, the modification rule is that a symbol of each of the sets of symbols to be modified is replaced with a different symbol.

In an embodiment, the modification rule is that the position of each of the sets of symbols to be modified is changed.

In an embodiment, each predetermined source symbol set represents a reel of symbols having a predefined order.

In an embodiment, the modification rule is that each reel of symbols to be modified is rotated.

In an embodiment, there are a plurality of winning symbol combinations, and the direction of rotation of each reel is dependent on which one of the winning symbol combinations occurs.

In an embodiment, there are a plurality of winning symbol combinations, and the amount of rotation of each reel is dependent on which one of the winning symbol combinations occurs.

In an embodiment, the electronic method includes conducting a base game and determining whether a trigger condition is met in the base game, wherein blocks (a) to (c) are carried out as part of a feature game upon the trigger condition being met in the base game.

In an embodiment, the trigger condition is that an ante bet has been placed.

In an embodiment, the base game is a spinning-reel type game.

In a second aspect, the invention provides a gaming system, including:
  a display;
  a symbol selector arranged to select a plurality of sets of symbols for display on the display;
  a symbol evaluator arranged to determine whether the displayed symbols include any winning symbol combination; and
  a symbol modifier arranged to, upon a determination that the displayed symbols include any winning symbol combination, repeatedly apply a modification rule to at least one of the plurality of sets of symbols until the displayed symbols do not include any winning symbol combination.

In an embodiment, the gaming system is arranged to make an award for each winning symbol combination.

In a third aspect, the invention provides a game controller for a gaming system, the game controller arranged to:
  select a plurality of sets of symbols for display on a display;
  determine whether the displayed symbols include any winning symbol combination; and
  upon determining that the displayed symbols include any winning symbol combination, repeatedly apply a modification rule to at least one of the plurality of sets of symbols until the displayed symbols do not include any winning symbol combination.

In an embodiment, the game controller is arranged to make an award for each winning symbol combination.

In an embodiment, the modification rule is applied to the sets of symbols that contribute to the winning symbol combination.

In an embodiment, the modification rule is applied to a random set of symbols.

In an embodiment, the modification rule is applied to a set of symbols selected by a player.

In an embodiment, each set of symbols is displayed on the display at respective ones of a plurality of columns of display positions.

In an embodiment, each set of symbols to be displayed is selected from a respective one of a plurality of predetermined source symbol sets.

In an embodiment, the modification rule is that a different set of symbols is selected from the plurality of predetermined source symbol sets for each of the sets of symbols to be modified.

In an embodiment, the modification rule is that a symbol of each of the sets of symbols to be modified is replaced with a different symbol.

In an embodiment, the modification rule is that the position of each of the sets of symbols to be modified is changed.

In an embodiment, each predetermined source symbol set represents a reel of symbols having a predefined order.

In an embodiment, the modification rule is that each reel of symbols to be modified is rotated.

In an embodiment, there are a plurality of winning symbol combinations, and the direction of rotation of each reel is dependent on which one of the winning symbol combinations occurs.

In an embodiment, there are a plurality of winning symbol combinations, and the amount of rotation of each reel is dependent on which one of the winning symbol combinations occurs.

In an embodiment, the game controller is arranged to:
  conducting a base game and a feature game;
  determine whether a trigger condition is met in the base game; and
  apply the modification rule only during the feature game.

In an embodiment, the trigger condition is that an ante bet has been placed.

In an embodiment, the base game is a spinning-reel type game.

In a fourth aspect, the invention provides a gaming machine including:
  a cabinet;
  a display mounted to the cabinet for displaying a plurality of sets of symbols to a player;
  a game play mechanism mounted to the cabinet, the game play mechanism operable by the player to initiate a play of a game; and
  a game controller mounted within the cabinet and communicatively coupled to the display and the game play mechanism, the game controller including:
    a symbol selector arranged to select a plurality of sets of symbols for display on the display to a player;
    a symbol evaluator arranged to determine whether the displayed symbols include any winning symbol combination; and
    a symbol modifier arranged to, upon a determination that the displayed symbols include any winning symbol combination, repeatedly apply a modification rule to at least one of the plurality of sets of symbols until the displayed symbols do not include any winning symbol combination.

In a fifth aspect, the invention provides computer program code which when executed implements the above method.

In a sixth aspect, the invention provides a tangible computer readable medium including the above program code.

In a seventh aspect, the invention provides a data signal including the above program code.

In an eighth aspect, the invention extends to transmitting the above program code.

BRIEF DESCRIPTION OF DRAWINGS

Certain exemplary embodiments of the invention will now be described with reference to the accompanying drawings in which.

Figure 1:
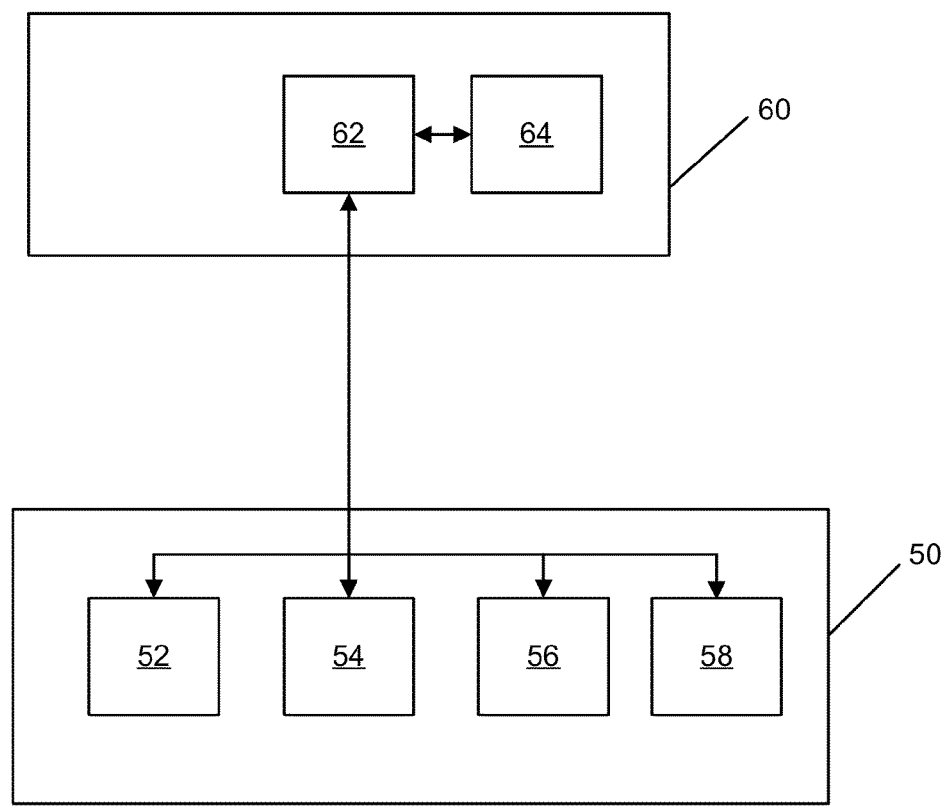
FIG. 1 is a block diagram of the core components of a gaming system.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF CERTAIN EMBODIMENTS

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, at least one of the elements in an at least one example is hereby expressly defined to include a tangible medium such as a memory, DVD, CD, Blu-ray, etc. storing the software and/or firmware.

Referring to the drawings, there is shown a gaming system arranged to implement a game where sets of symbols are displayed on a display and a modification rule is applied to at least one of the sets of symbols whenever there is a determination that the displayed symbols include a winning symbol combination. The modification rule is repeatedly applied until there is no winning symbol combination. In an advantageous embodiment, the modification rule is applied to each game outcome during a feature game.

General Construction of Gaming System

The gaming system can take a number of different forms. In a first form, a stand alone gaming machine is provided wherein all or most components to implement the game are present in a player operable gaming machine.

In a second form, a distributed architecture is provided wherein some of the components to implement the game are present in a player operable gaming machine and some of the components to implement the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system has several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
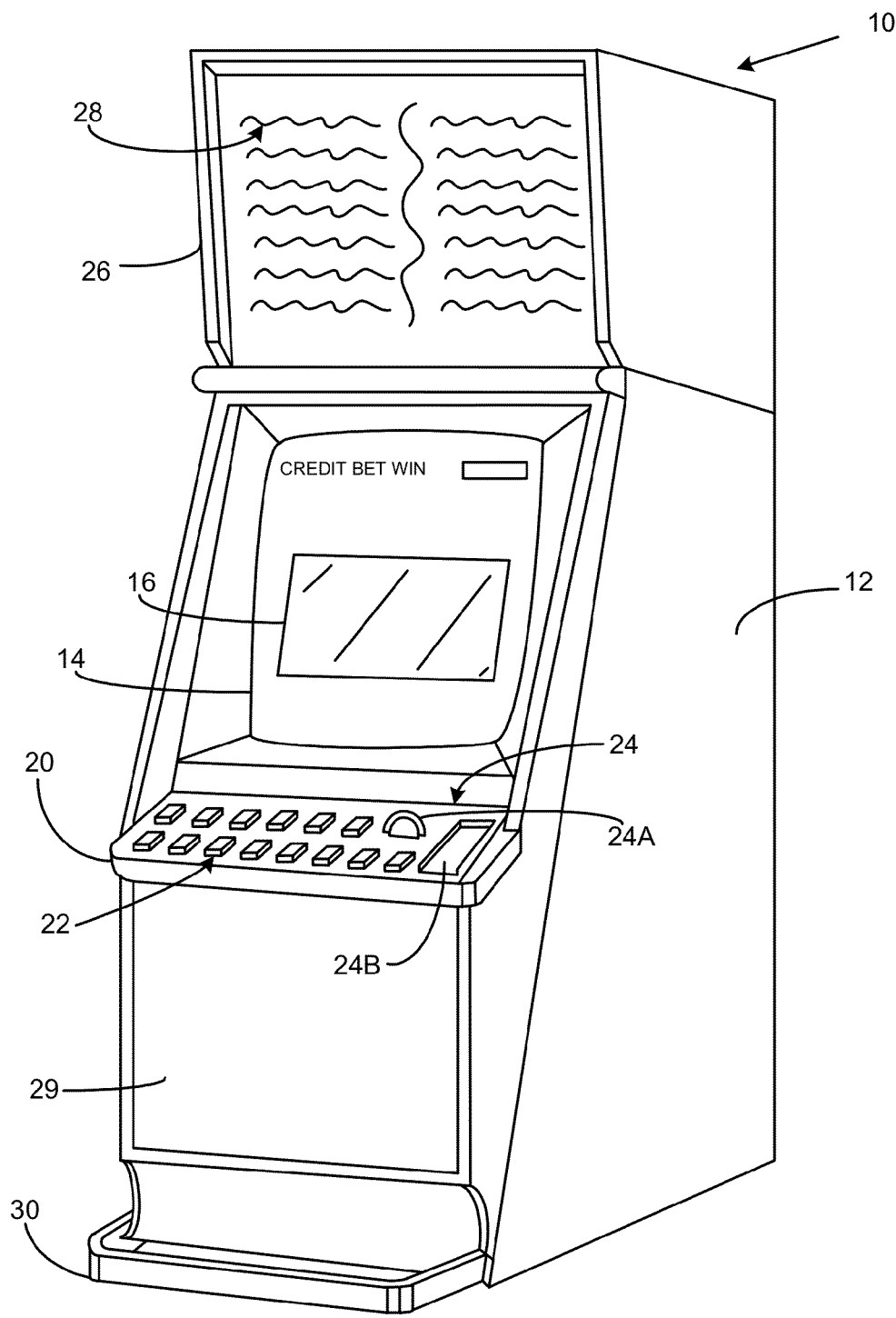
FIG. 2 is a perspective view of a stand alone gaming machine.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
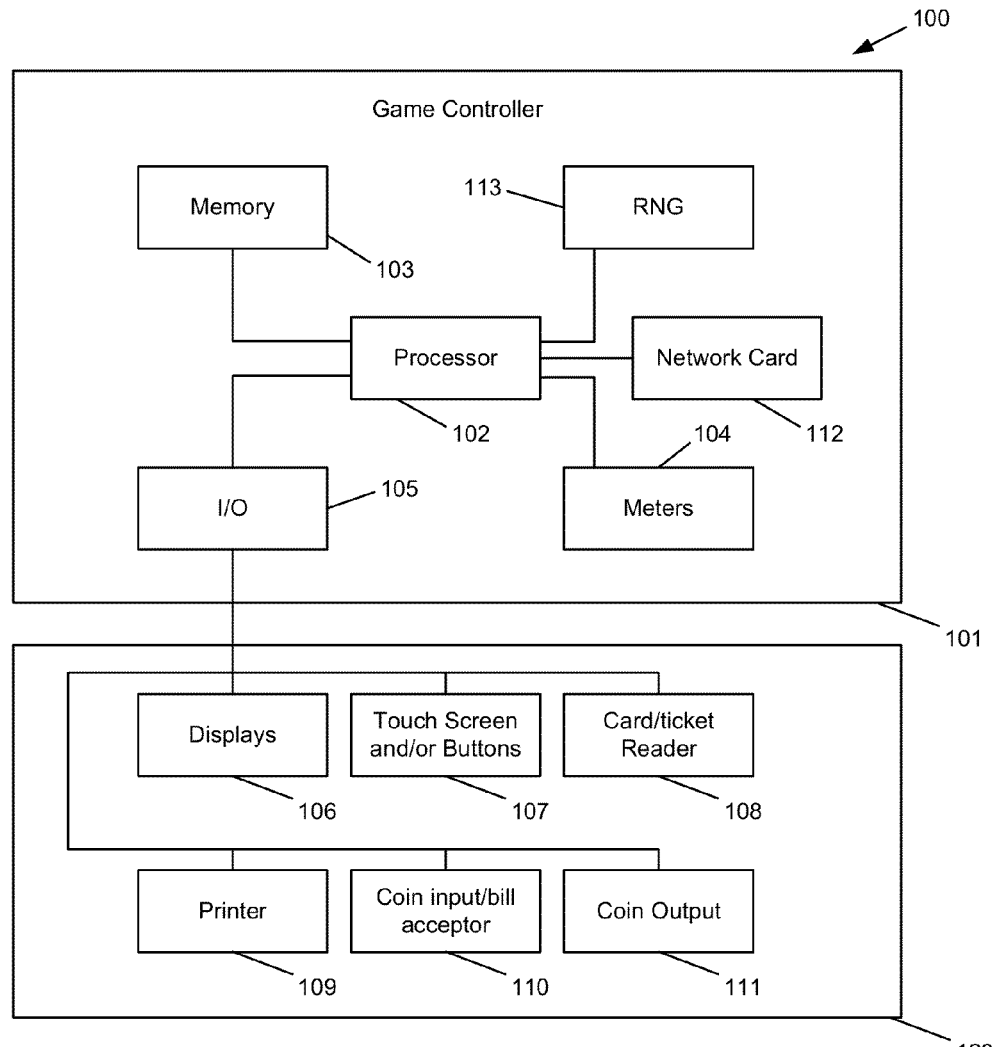
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted based on the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
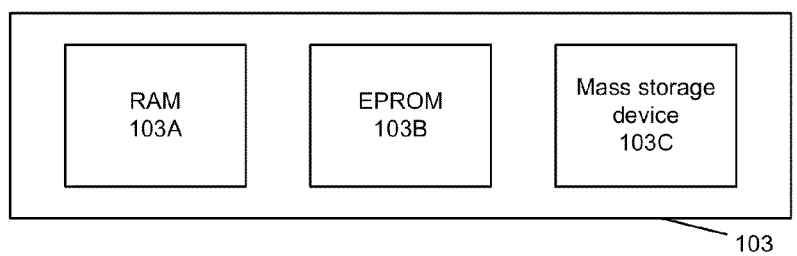
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
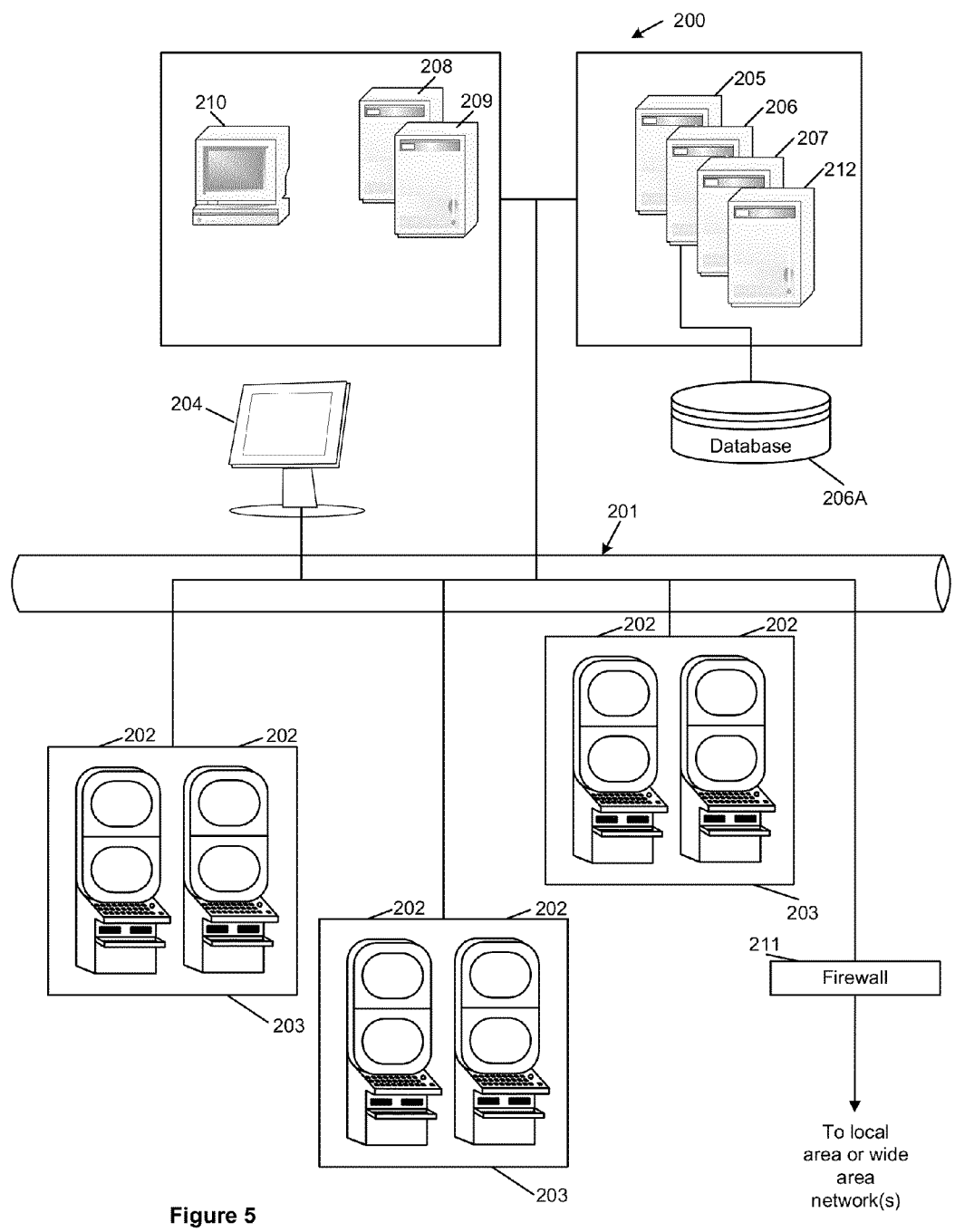
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the rules, guidelines, requirements, and/or preferences for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games.

An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games based on the terminals.

Further Details of Gaming System

Figure 6:
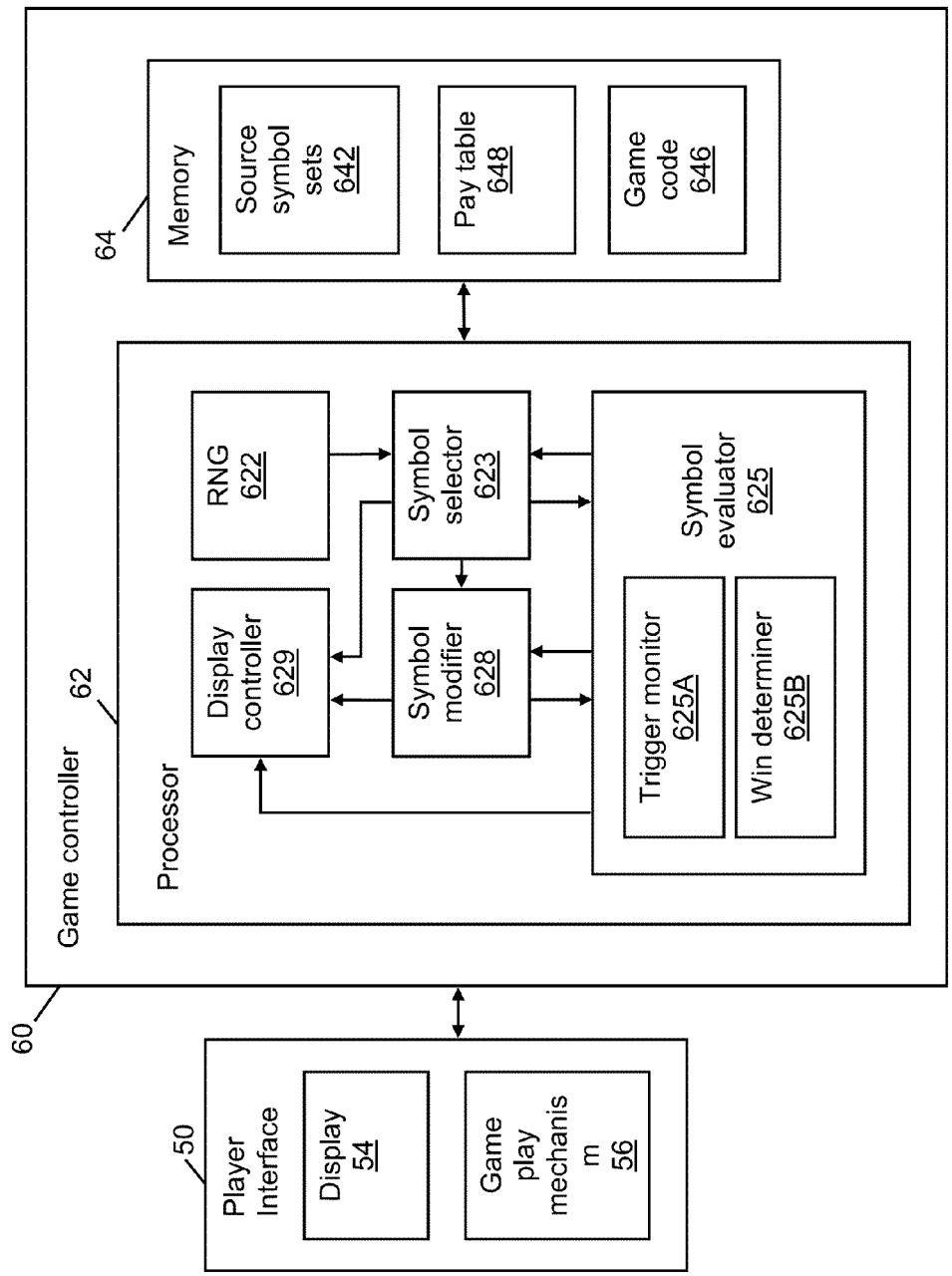
FIG. 6 is a further block diagram of a gaming system.

FIG. 6 shows the functional components of an embodiment of the gaming system having a game controller 60 including a processor 62 arranged to implement a number of modules based on game code 646 and data stored in memory 64. Persons skilled in the art will appreciate that the modules are typically implemented using a processor based on code and data stored in memory but that one or more of the modules could alternatively be implemented in some other way, for example by a dedicated circuit.

In the embodiment, the gaming system is arranged to conduct a spinning-reel type game where, during game play, symbols are selected and displayed at a plurality of sets of display positions on a display 54, and a determination based on the displayed symbols is made on whether the displayed symbols include a winning symbol combination. In the embodiment, the display 64 is part of a player interface 50. Persons skilled in the art will appreciate that the number of symbols displayed on the display 54 in the spinning-reel type game (that is, the number of sets of symbols and/or the number of symbols per set of symbols) may vary. For example, in a 4×6 spinning-reel type game, there are four sets of symbols displayed on the display 54, each set of symbols being displayed at six vertically adjacent display positions; in a 5×3 spinning-reel type game, there are five sets of symbols, each set of symbols being displayed at three vertically adjacent display positions etc.

In the embodiment, the spinning-reel type game includes a base game and a feature game. Persons skilled in the art will appreciate that the base game is a part of the spinning-reel type game that is initiated every time a player places a wager and the feature game is a part of the spinning-reel type game that is played only occasionally upon a trigger condition being met. That is, the feature game is a feature of the spinning-reel type game that is in addition to the base game. Persons skilled in the art will appreciate that the base game and the feature game may be different, for example, the symbols of the feature game may be different from those of the base game. In the embodiment, the player interface 50 also includes a game play mechanism 56 for allowing a player to place wagers.

Depending on the embodiment, the spinning-reel type game can be a line-based game or a reel-based game. In a line-based game, a player's win entitlement is based on how many win lines the player plays in each game (for example, a minimum of one win line up to the maximum number of win lines allowed by the game) and how much they wager per line. Such win lines are typically formed by a combination of symbol display positions, one from each reel, the symbol display positions being located relative to one another such that they form a line. Persons skilled in the art will appreciate that in some line-based games, the player's win entitlement may not be strictly limited to the lines they have selected, for example, "scatter" pays can be awarded independently of a player's selection of pay lines and can be an inherent part of a win entitlement. In such games, a winning symbol combination must fall on a win line selected by the player (or otherwise be part of the win entitlement) for the player to be awarded the corresponding award.

In a reel-based game, a player obtains a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at designated, symbol display positions of the other reels. For example, if there are five reels and three symbol display positions for each reel such that the symbol display positions include three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. Thus, for a 5×3 spinning-reel type game having five reels and fifteen display positions, there can be 243 ways to win, such that a player wins an award if a winning combination is covered by any one of these ways to win.

As illustrated by FIG. 6, the modules implemented by the processor 62 include a symbol selector 623, a symbol evaluator 625, and a symbol modifier 628.

The symbol selector 623 is arranged to select a symbol for display at each of the display positions on the display 54 during the base game and the feature game. In the embodiment, each symbol is selected from one of a plurality of predetermined sequences of symbols specified in source symbol sets 642 stored in memory 64, each predetermined sequence of symbols representing a virtual reel of symbols having a predefined order. During game play, the symbol selector 623 selects the symbols for display on the display 54 at a set of display positions by selecting a stopping position in the sequence. In the embodiment, the stopping position is determined based on pseudo-random numbers generated by a Random Number Generator (RNG) 622. Persons skilled in the art will appreciate that the reels may alternatively be implemented using electromechanical reels controlled by a stepper motor.

In the embodiment, the symbol evaluator 625 includes a trigger monitor 625A arranged to determine whether a trigger condition is met during the base game. In the embodiment, the trigger condition is that an ante bet has been placed by the player and a designated symbol combination has occurred in the base game. Persons skilled in the art will appreciate that the trigger condition may alternatively be only the occurrence of a particular symbol combination (or symbol); be caused by another connected system; be based on a random evaluation etc.

The gaming system is arranged to initiate a feature game upon a determination by the trigger monitor 625A that a trigger condition is met in the base game. Accordingly, upon a determination by the trigger monitor 625A that the trigger condition has been met in the base game, the symbol selector 623 automatically selects a new plurality of symbols for display at the display positions on the display 54 for the feature game. In the embodiment, the symbol selector 623 is arranged to select the symbols for the feature game in the same way as for the base game (that is, from the same plurality of predetermined sequences of symbols specified in source symbol sets 642 based on pseudo-random numbers generated by the RNG 622). However, it is envisaged that in another embodiment, the symbol selector 623 may select symbols differently, for example, by selecting from a different plurality of predetermined symbols.

The symbol evaluator 625 also includes a win determiner 625B that is arranged to determine whether the displayed symbols include any winning symbol combination. A winning symbol combination entitles the player to one of the awards specified in pay table 648 of memory 64. Persons skilled in the art will appreciate that there can be different winning symbol combinations in the spinning reel-type game (such as left-to-right winning symbol combinations, scatter winning symbol combinations, wild winning symbol combinations etc). In the embodiment, the awards are in credits and thus each award is added to a win meter stored in memory 64. Persons skilled in the art will appreciate that there can be different types of awards in the spinning reel-type game (such as free spins, re-spins etc).

In the embodiment, the symbol modifier 628 is arranged to, upon a determination by the win determiner 625B that the displayed symbols include any winning symbol combination, repeatedly apply a modification rule to at least one of the sets of symbols until the displayed symbols do not include any winning symbol combination. That is, the symbol modifier 628 applies a modification rule to the display symbols whenever there is a winning symbol combination entitling the player to an award. In the embodiment, the symbol modifier 628 is arranged to apply the modification rule only to the sets of symbols that contribute to the winning symbol combination. However, it is envisaged that, in other embodiments, the modification rule may be applied to other sets of symbols. For example, the modification rule may in one embodiment be applied at random to any one of more of the sets of symbols, or the modification rule may in another embodiment be applied only to the sets of symbols selected by the player.

In the embodiment, the modification rule is that a different set of symbols is selected for each of the sets of symbols to be modified (that is, each of the sets that contribute to the winning symbol combination). Accordingly, in the embodiment, all the symbols (of the sets of symbols to be modified) are modified after the application of the modification rule. However, it is envisaged that in alternative embodiments, the modification rule may not apply to all the symbols of the sets of symbols to be modified. For example, the gaming system may modify the displayed symbols by replacing only one of the symbols (from each of the sets of symbols to be modified) with a different symbol.

In the embodiment, the modification rule (that is, the selection of a different set of symbols for each of the sets of symbols to be modified) is carried out by rotating the virtual reels corresponding to the sets of symbols that contribute to the winning symbol combination (that is, the sets to be modified). It is envisaged that, in other embodiments, the modification rule may be carried out in some other way, for example, the modification may be carried out by changing or swapping the positions of the sets of symbols to be modified.

In the embodiment, the virtual reels corresponding to the sets of symbols that contribute to the winning symbol combination are rotated downward by one symbol. Therefore, upon a determination that there is a winning symbol combination in the displayed symbols, the symbol modifier 628 automatically rotates the virtual reels corresponding to the sets of symbols that contribute to the winning symbol combination downward by one symbol. It is envisaged that in an alternative embodiment, the rotation of the virtual reels may depend on the ante bet placed by the player (for example, the virtual reels may be rotated downward by more than one symbol if the ante bet is above a certain amount). It is also envisaged that in another embodiment, different sets of symbols may also be modified differently by rotating each reel differently (for example, the direction and/or the amount of rotation of each reel may be rotated differently depending on the symbols of the winning symbol combination).

As indicated above, the symbol modifier 626 is arranged to repeatedly apply the modification rule until the displayed symbols do not include any winning symbol combination. That is, the symbol modifier 626 continually modifies the sets of symbols so long as the displayed symbols include a winning symbol combination. In the embodiment, an award is added to the win meter whenever the win determiner 625B determines that the displayed symbols include a winning symbol combination. In the embodiment, upon a determination by the win determiner 625B that the displayed symbols do not include any winning symbol combination, credits in the win meter are transferred to the credit meter.

Figure 7:
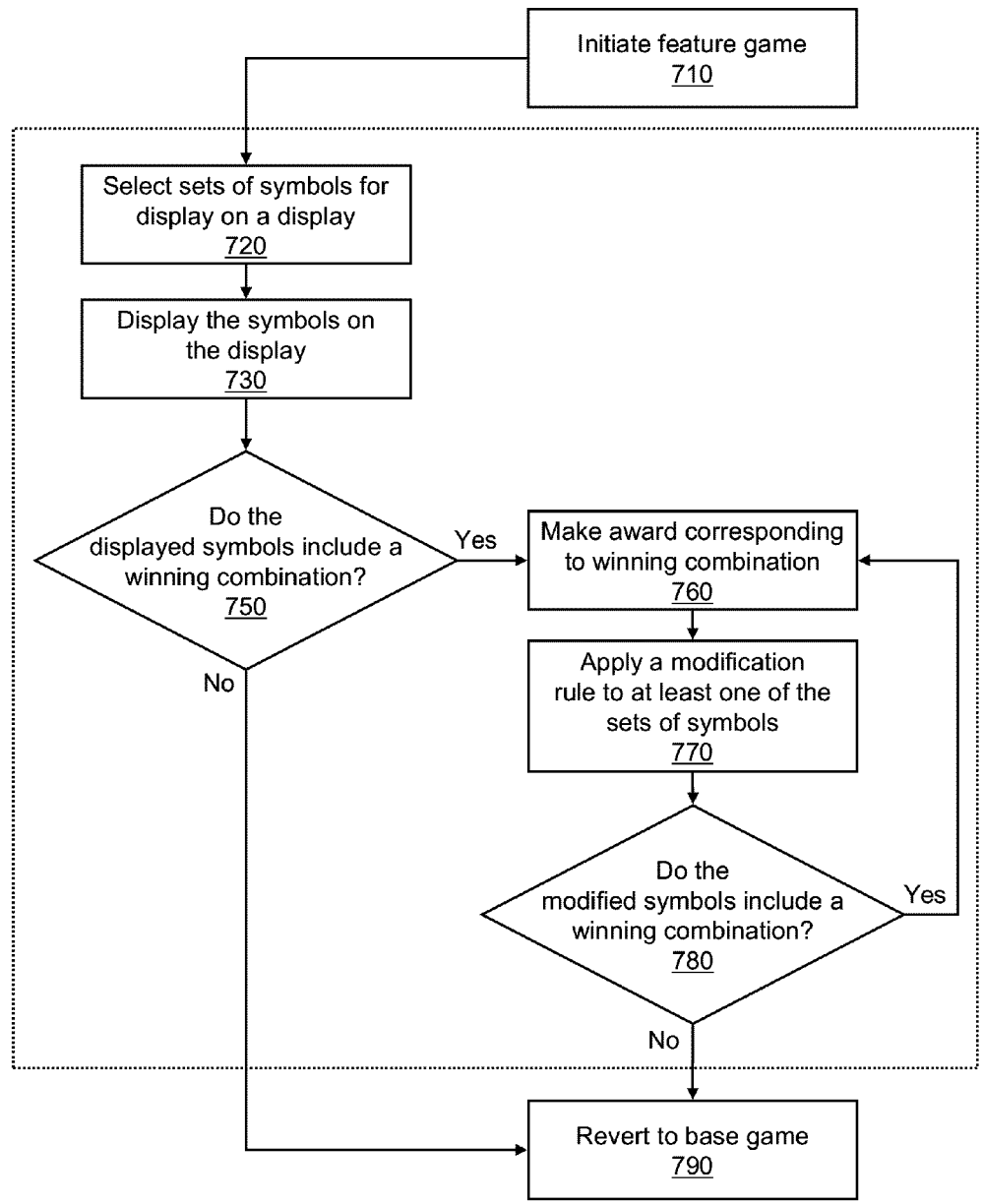
FIG. 7 is a flow chart of an embodiment.

FIG. 7 depicts an example flow diagram representative of processes that can be implemented using, for example, computer readable instructions that can be used to provide a method of gaming The example processes of FIG. 7 can be performed using a processor, a controller and/or any other suitable processing device. For example, the example processes of FIG. 7 can be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 7 can be implemented using coded instructions (e.g., computer readable instructions) stored on a non-transitory computer readable medium such as a flash memory, a read-only memory (ROM), a random-access memory (RAM), a CD, a DVD, a Blu-ray, a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 7 can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 7 can be implemented manually or as any combination(s) of any of the foregoing techniques, for example, any combination of firmware, software, discrete logic and/or hardware. Further, although the example processes of FIG. 7 are described with reference to the flow diagram of FIG. 7, other methods of implementing the processes of FIG. 7 may be employed. For example, the order of execution of the blocks can be changed, and/or some of the blocks described may be changed, eliminated, sub-divided, or combined. Additionally, any or all of the example processes of FIG. 7 can be performed sequentially and/or in parallel by, for example, separate processing threads, processors, devices, discrete logic, circuits, etc.

FIG. 7 is a flowchart illustrating an embodiment of the method of gaming. At block 710, the gaming system initiates a feature game after the trigger monitor 625A of the symbol evaluator 625 determines that a trigger condition has been met in the base game.

At block 720, the symbol selector 623 selects a new plurality of sets of symbols for each of the display positions on the display 54 that replaces the previous symbols displayed at each of the display positions in the base game.

As discussed above, in the embodiment, the symbol selector 623 selects the symbols for each set of symbols by selecting a stopping position in the corresponding virtual reel of symbols (specified by the source symbol sets 642 stored in memory) based on pseudo-random numbers from the RNG 622.

At block 730, the symbols selected by the symbol selector 623 are displayed by the display controller 629 on the display 54.

At block 750, the win determiner 625B of the symbol evaluator 625 determines whether the displayed symbols include any winning symbol combination. If the displayed symbols do not include any winning symbol combination, the gaming system reverts back to the base game 790.

If the win determiner 625B determines that the displayed symbols include a winning symbol combination at block 750, an award corresponding to the winning symbol combination is made to the player at block 760.

At block 770, the symbol modifier 628 then applies a modification to at least one of the sets of symbols. As discussed above, in the embodiment, the symbol modifier modifies the displayed symbols by rotating the virtual reels corresponding to the sets of symbols that contribute to the winning symbol combination downward by one symbol position.

At block 780, the win determiner 625B of the symbol evaluator 625 determines again whether the displayed symbols include any winning symbol combination. If the displayed symbols again include a winning symbol combination again, the blocks 760 and 770 are repeated (that is, another award corresponding to the new winning symbol combination is made to the player and the symbol modifier 628 again modifies the displayed symbols by rotating the virtual reels corresponding to the sets of symbols that contribute to the winning symbol combination downward by one symbol).

The blocks 760 and 770 are repeated until the win determiner 625B determines that the display symbols do not include any winning symbol combination upon which the gaming system reverts back to the base game 790.

Further aspects of the method will be apparent from the above description of the system. It will be appreciated that at least part of the method will be implemented digitally by a processor. Persons skilled in the art will also appreciate that the method could be embodied in program code. The program code could be supplied in a number of ways, for example on a tangible computer readable storage medium, such as a disc or a memory (for example, that could replace part of memory 103) or as a data signal (for example, by transmitting it from a server). Persons skilled in the art, will appreciate that program code provides a series of instructions executable by the processor.

EXAMPLE

FIGS. 8A to 8G illustrate an example of the gaming system applying a modification rule to at least one of the sets of symbols displayed in the feature game. In the example, the game is a 3×5 spinning-reel type game.

Figure 8A:
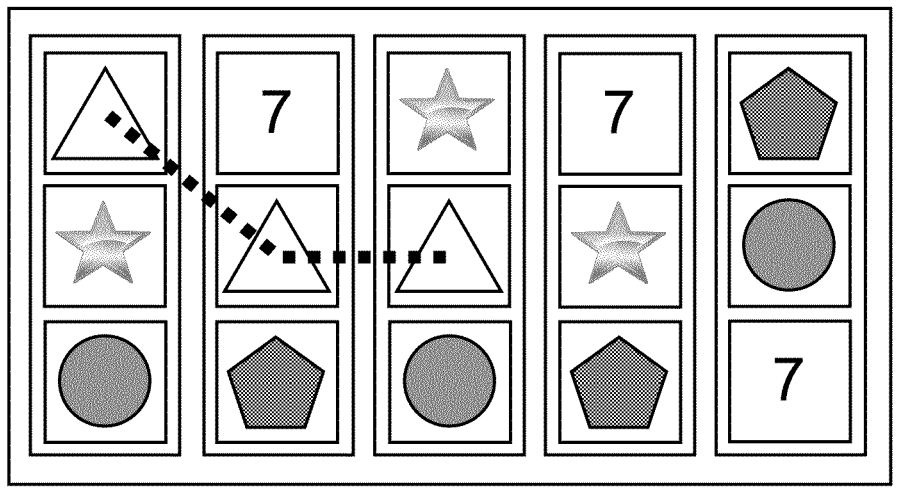
FIGS. 8A to 8G are diagrammatic representations of an example of a game.

FIG. 8A illustrates the initial sets of symbols selected by the symbol selector 623 for display in the feature game at each of the fifteen display positions on the display 54.

As discussed above, the symbols are selected and displayed on the display 54 after a determination by the trigger monitor 625A that a trigger condition has been met in a base game.

As shown in the figure, the displayed symbols include a winning combination formed by three triangle symbols in the first three columns of display positions (as indicated by the dotted line). As indicated above, the determination of whether the displayed symbols include a winning symbol combination is made by the win determiner 625B of the symbol evaluator 625.

In the example, as there is a winning symbol combination, the gaming system makes an award (corresponding to the winning symbol combination) to the player. As discussed above, the award is one of the awards stored in pay table 648 of memory 64.

Figure 8B:
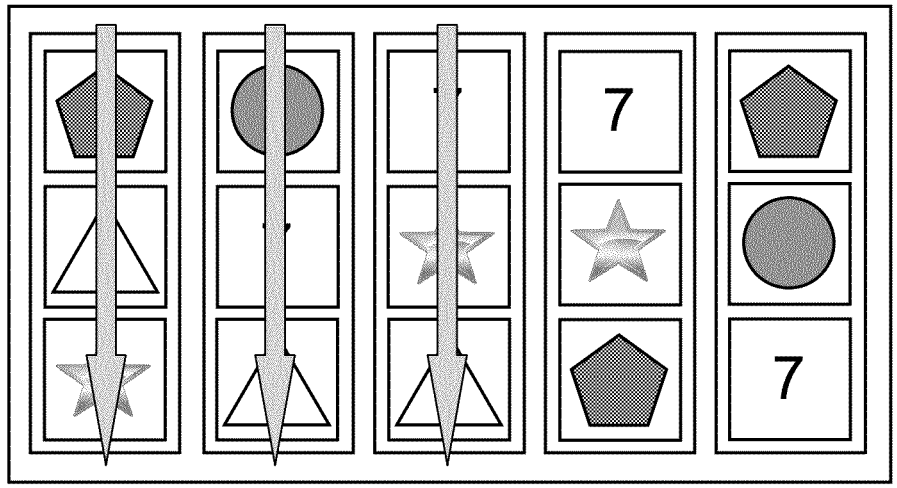

Upon a determination by the win determiner 625B that the displayed symbols include a winning symbol combination, the symbol modifier 628 also automatically applies a modification rule to at least one of the sets of symbols by rotating the reels corresponding to the sets of symbols that contribute to the winning symbol combination downward by one symbol. This is illustrated in FIG. 8B. As shown in the figure, the first three reels of symbols (displayed at the first three columns of display positions) are rotated downward by one position.

Figure 8C:
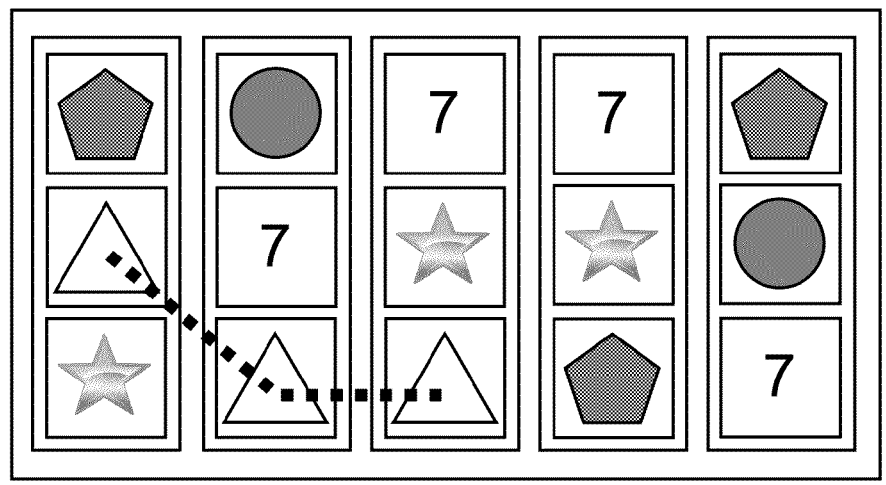

FIG. 8C illustrates the symbols displayed at the fifteen display positions on the display 54 after modification.

As shown in the figure, the displayed symbols again include a winning combination formed by three triangle symbols displayed at the first three columns of display positions (as indicated again by the dotted line).

Thus, the gaming system makes another award to the player corresponding to the winning symbol combination and the symbol modifier 628 again modifies the sets of symbols by rotating the reels corresponding to the sets of symbols that contribute to the winning symbol combination (that is, the first three reels of symbols).

Figure 8D:
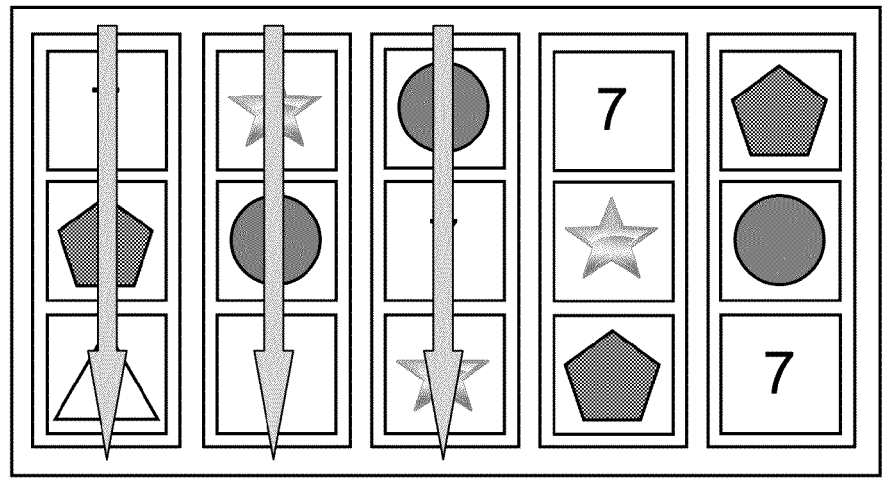

FIG. 8D illustrates the rotation of the reels corresponding to the sets of symbols that contribute to the winning symbol combination.

Figure 8E:
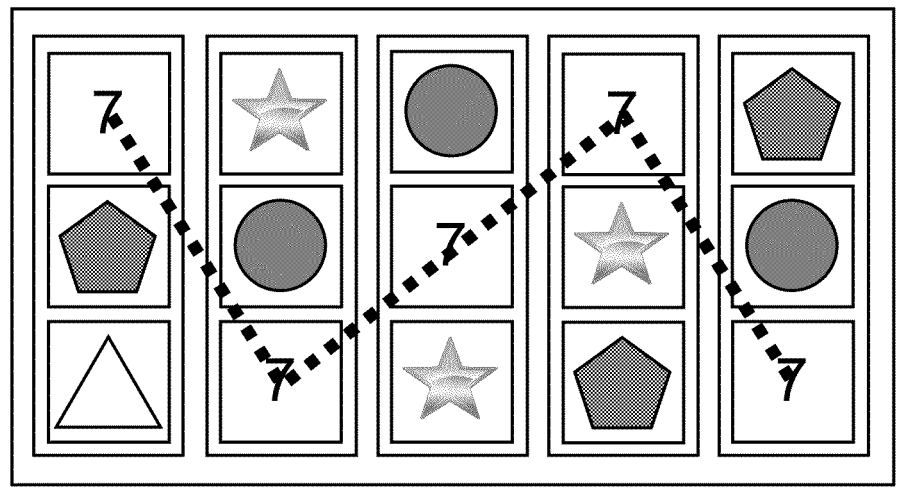

FIG. 8E illustrates the symbols displayed at the fifteen display positions on the display 54 after re-modification. As shown in this figure, the displayed symbols now include a winning combination formed by five number "7" symbols displayed at the five columns of display positions (as indicated again by the dotted line).

Figure 8F:
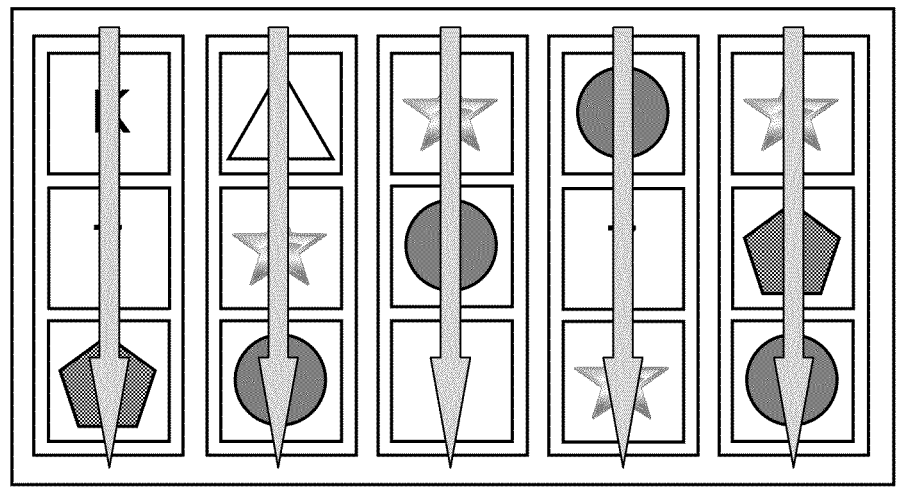

Accordingly, another award (corresponding to the five number "7" winning symbol combination) is made to the player and the symbol modifier 628 again applies a modification rule as illustrated in FIG. 8F. As shown in the figure, since all of the reels corresponding to the sets of symbols that contribute to the winning symbol combination, the reels corresponding to all the sets of symbols are rotated downward by one symbol.

Figure 8G:
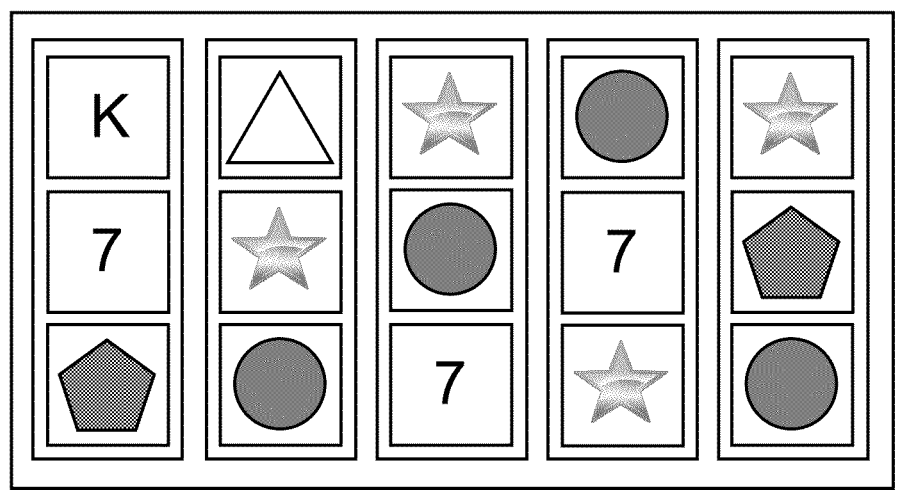

FIG. 8G illustrates the symbols after the application of the modification rule. In this instance, the win determiner 625B determines that the displayed symbols do not include any winning symbol combination and the gaming system reverts back to the base game.

It will be understood to persons skilled in the art of the invention that many modifications may be made without departing from the spirit and scope of the invention, in particular it will be apparent that certain features of embodiments of the invention can be employed to form further embodiments.

It is to be understood that any reference to prior art made herein does not constitute an admission that the prior art forms or formed a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Method steps or blocks associated with certain embodiments may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps or blocks of the methods disclosed herein. The particular sequence of such executable instructions or associated data structures represents examples of corresponding acts for implementing the functions described in such steps or blocks.

The invention claimed is:

1. An electronic method of gaming, comprising:
   (a) selecting, using a processor, a plurality of sets of symbols for display on a display;
   (b) determining, using the processor, whether the displayed symbols include any winning symbol combination; and
   (c) upon determining that the displayed symbols include any winning symbol combination, repeatedly applying a modification rule to at least one of the plurality of sets of symbols until the displayed symbols do not include any winning symbol combination,
   wherein each set of symbols to be displayed is selected from a respective one of a plurality of predetermined source symbol sets, and wherein the modification rule is that a different set of symbols is selected from the plurality of predetermined source symbol sets for each of the sets of symbols to be modified.

2. An electronic method as claimed in claim 1, comprising making an award for each winning symbol combination.

3. An electronic method as claimed in claim 1, wherein the modification rule is applied to the sets of symbols that contribute to the winning symbol combination.

4. An electronic method as claimed in claim 1, wherein the modification rule is applied to a random set of symbols.

5. An electronic method as claimed in claim 1, wherein the modification rule is applied to a set of symbols selected by a player.

6. An electronic method as claimed in claim 1, wherein each set of symbols is displayed on the display at respective ones of a plurality of columns of display positions.

7. An electronic method as claimed in claim 1, wherein the modification rule is that a symbol of each of the sets of symbols to be modified is replaced with a different symbol.

8. An electronic method as claimed in claim 1, wherein the modification rule is that the position of each of the sets of symbols to be modified is changed.

9. An electronic method as claimed in claim 1, wherein each predetermined source symbol set represents a reel of symbols having a predefined order.

10. An electronic method as claimed in claim 9, wherein the modification rule is that each reel of symbols to be modified is rotated.

11. An electronic method as claimed in claim 10, wherein there are a plurality of winning symbol combinations, and the direction of rotation of each reel is dependent on which one of the winning symbol combinations occurs.

12. An electronic method as claimed in claim 10, wherein there are a plurality of winning symbol combinations, and the amount of rotation of each reel is dependent on which one of the winning symbol combinations occurs.

13. An electronic method as claimed in claim 1, further comprising conducting a base game and determining whether a trigger condition is met in the base game, wherein (a) to (c) are carried out as part of a feature game upon the trigger condition being met in the base game.

14. An electronic method as claimed in claim 13, wherein the trigger condition is that an ante bet has been placed.

15. An electronic method as claimed in claim 13, wherein the base game is a spinning-reel type game.

16. A gaming system, comprising:
   a display;
   a symbol selector arranged to select a plurality of sets of symbols for display on the display;
   a symbol evaluator arranged to determine whether the displayed symbols include any winning symbol combination; and
   a symbol modifier arranged to, upon a determination that the displayed symbols include any winning symbol combination, repeatedly apply a modification rule to at least one of the plurality of sets of symbols until the displayed symbols do not include any winning symbol combination,
   wherein each set of symbols to be displayed is selected from a respective one of a plurality of predetermined source symbol sets, and wherein the modification rule is that a different set of symbols is selected from the plurality of predetermined source symbol sets for each of the sets of symbols to be modified.

17. A gaming system as claimed in claim 16, wherein the gaming system is arranged to make an award for each winning symbol combination.

18. A gaming system as claimed in claim 16, wherein the modification rule is applied to the sets of symbols that contribute to the winning symbol combination.

19. A gaming system as claimed in claim 16, wherein the modification rule is applied to a random set of symbols.

20. A gaming system as claimed in claim 16, wherein the modification rule is applied to a set of symbols selected by a player.

21. A gaming system as claimed in claim 16, wherein each set of symbols is displayed on the display at respective ones of a plurality of columns of display positions.

22. A gaming system as claimed in claim 16, wherein the modification rule is that a symbol of each of the sets of symbols to be modified is replaced with a different symbol.

23. A gaming system as claimed in claim 16, wherein the modification rule is that the position of each of the sets of symbols to be modified is changed.

24. A gaming system as claimed in claim 16, wherein each predetermined source symbol set represents a reel of symbols having a predefined order.

25. A gaming system as claimed in claim 24, wherein the modification rule is that each reel of symbols to be modified is rotated.

26. A gaming system as claimed in claim 25, wherein there are a plurality of winning symbol combinations, and the direction of rotation of each reel is dependent on which one of the winning symbol combinations occurs.

27. A gaming system as claimed in claim 25, wherein there are a plurality of winning symbol combinations, and the amount of rotation of each reel is dependent on which one of the winning symbol combinations occurs.

28. A gaming system as claimed in claim 16, wherein the gaming system is arranged to:
   conduct a base game and a feature game;
   determine whether a trigger condition is met in the base game; and
   apply the modification rule only during the feature game.

29. A gaming system as claimed in claim 28, wherein the trigger condition is that an ante bet has been placed.

30. A gaming system as claimed in claim 28, wherein the base game is a spinning-reel type game.

31. A game controller for a gaming system, the game controller arranged to:

select a plurality of sets of symbols for display on a display;

determine whether the displayed symbols include any winning symbol combination; and upon determining that the displayed symbols include any winning symbol combination, repeatedly apply a modification rule to at least one of the plurality of sets of symbols until the displayed symbols do not include any winning symbol combination, wherein each set of symbols to be displayed is selected from a respective one of a plurality of predetermined source symbol sets, and wherein the modification rule is that a different set of symbols is selected from the plurality of predetermined source symbol sets for each of the sets of symbols to be modified.

32. A game controller as claimed in claim 31, wherein the game controller is arranged to make an award for each winning symbol combination.

33. A game controller as claimed in claim 31, wherein the modification rule is applied to the sets of symbols that contribute to the winning symbol combination.

34. A game controller as claimed in claim 31, wherein the modification rule is applied to a random set of symbols.

35. A game controller as claimed in claim 31, wherein the modification rule is applied to a set of symbols selected by a player.

36. A game controller as claimed in claim 31, wherein each set of symbols is displayed on the display at respective ones of a plurality of columns of display positions.

37. A game controller as claimed in claim 31, wherein the modification rule is that a symbol of each of the sets of symbols to be modified is replaced with a different symbol.

38. A game controller as claimed in claim 31, wherein the modification rule is that the position of each of the sets of symbols to be modified is changed.

39. A game controller as claimed in claim 31, wherein each predetermined source symbol set represents a reel of symbols having a predefined order.

40. A game controller as claimed in claim 39, wherein the modification rule is that each reel of symbols to be modified is rotated.

41. A game controller as claimed in claim 40, wherein there are a plurality of winning symbol combinations, and the direction of rotation of each reel is dependent on which one of the winning symbol combinations occurs.

42. A game controller as claimed in claim 40, wherein there are a plurality of winning symbol combinations, and the amount of rotation of each reel is dependent on which one of the winning symbol combinations occurs.

43. A game controller as claimed in claim 31, the game controller is arranged to:
conducting a base game and a feature game;
determine whether a trigger condition is met in the base game; and
apply the modification rule only during the feature game.

44. A game controller as claimed in claim 43, wherein the trigger condition is that an ante bet has been placed.

45. A game controller as claimed in claim 43, wherein the base game is a spinning-reel type game.

46. A gaming machine comprising:
a cabinet;
a display mounted to the cabinet for displaying a plurality of sets of symbols to a player;
a game play mechanism mounted to the cabinet, the game play mechanism operable by the player to initiate a play of a game; and
a game controller mounted within the cabinet and communicatively coupled to the display and the game play mechanism, the game controller comprising:
a symbol selector arranged to select a plurality of sets of symbols for display on the display to a player;
a symbol evaluator arranged to determine whether the displayed symbols include any winning symbol combination; and
a symbol modifier arranged to, upon a determination that the displayed symbols include any winning symbol combination, repeatedly apply a modification rule to at least one of the plurality of sets of symbols until the displayed symbols do not include any winning symbol combination,
wherein each set of symbols to be displayed is selected from a respective one of a plurality of predetermined source symbol sets, and wherein the modification rule is that a different set of symbols is selected from the plurality of predetermined source symbol sets for each of the sets of symbols to be modified.

47. A non-transitory computer readable medium comprising computer program code which, when executed, implements an electronic method of gaming comprising:
(a) selecting a plurality of sets of symbols for display on a display;
(b) determining whether the displayed symbols include any winning symbol combination; and
(c) upon determining that the displayed symbols include any winning symbol combination, repeatedly applying a modification rule to at least one of the plurality of sets of symbols until the displayed symbols do not include any winning symbol combination,
wherein each set of symbols to be displayed is selected from a respective one of a plurality of predetermined source symbol sets, and wherein the modification rule is that a different set of symbols is selected from the plurality of predetermined source symbol sets for each of the sets of symbols to be modified.

48. A non-transitory computer readable medium comprising computer program code which, when executed, implements a gaming controller for a gaming system, the gaming controller arranged to:
select a plurality of sets of symbols for display on a display;
determine whether the displayed symbols include any winning symbol combination; and
upon determining that the displayed symbols include any winning symbol combination, repeatedly apply a modification rule to at least one of the plurality of sets of symbols until the displayed symbols do not include any winning symbol combination,
wherein each set of symbols to be displayed is selected from a respective one of a plurality of predetermined source symbol sets, and wherein the modification rule is that a different set of symbols is selected from the plurality of predetermined source symbol sets for each of the sets of symbols to be modified.

49. A gaming system, comprising:
a display;
a symbol selector arranged to select a plurality of sets of symbols for display on the display;
a symbol evaluator arranged to determine whether the displayed symbols include any winning symbol combination; and
a symbol modifier arranged to, upon a determination that the displayed symbols include any winning symbol combination, repeatedly apply a modification rule to at least one of the plurality of sets of symbols until the displayed symbols do not include any winning symbol combination, wherein each set of symbols to be displayed is selected from a respective one of a plurality of predetermined source symbol sets, and wherein the modification rule is that a symbol of each of the sets of symbols to be modified is replaced with a different symbol.

50. A game controller for a gaming system, the game controller arranged to:
select a plurality of sets of symbols for display on a display;
determine whether the displayed symbols include any winning symbol combination; and
upon determining that the displayed symbols include any winning symbol combination, repeatedly apply a modification rule to at least one of the plurality of sets of symbols until the displayed symbols do not include any winning symbol combination,
wherein each set of symbols to be displayed is selected from a respective one of a plurality of predetermined source symbol sets, and wherein the modification rule is that a symbol of each of the sets of symbols to be modified is replaced with a different symbol.

* * * * *